US012798881B2

(12) United States Patent
Zucker

(10) Patent No.: US 12,798,881 B2
(45) Date of Patent: Nov. 17, 2026

(54) CONVEYING APPARATUS FOR CONTAINERS, MORE PARTICULARLY PHARMACEUTICAL CONTAINERS

(71) Applicant: Bausch + Ströbel SE + Co. KG, Ilshofen (DE)

(72) Inventor: Jonas Zucker, Ilshofen (DE)

(73) Assignee: Bausch + Stroebel SE + Co. KG, Ilshofen (DE)

(*) Notice: Subject to any disclaimer, the term of this patent is extended or adjusted under 35 U.S.C. 154(b) by 113 days.

(21) Appl. No.: 19/025,694

(22) Filed: Jan. 16, 2025

(65) Prior Publication Data

US 2025/0153949 A1 May 15, 2025

Related U.S. Application Data

(63) Continuation of application No. PCT/EP2023/069925, filed on Jul. 18, 2023.

(30) Foreign Application Priority Data

Jul. 19, 2022 (DE) ..................... 10 2022 118 095.6

(51) Int. Cl.
*B65G 29/02* (2006.01)
*B65G 11/02* (2006.01)
(Continued)

(52) U.S. Cl.
CPC .......... *B65G 11/023* (2013.01); *B65G 11/203* (2013.01); *B65G 47/24* (2013.01); *B65G 2201/0244* (2013.01)

(58) Field of Classification Search
CPC .... B65G 11/023; B65G 11/203; B65G 29/02; B65G 47/14; B65G 47/24
See application file for complete search history.

(56) References Cited

U.S. PATENT DOCUMENTS

| | | | |
|---|---|---|---|
| 3,517,795 | A | 6/1970 | Dixon |
| 3,912,120 | A | 10/1975 | Hoppmann et al. |

(Continued)

FOREIGN PATENT DOCUMENTS

| | | | |
|---|---|---|---|
| DE | 2537397 | C2 | 3/1976 |
| DE | 2651495 | C2 | 5/1978 |

(Continued)

*Primary Examiner* — Douglas A Hess
(74) *Attorney, Agent, or Firm* — Christopher A. Rothe; CM Law

(57) ABSTRACT

A conveying apparatus for pharmaceutical containers includes a stator device having a transfer opening. The containers are able to be fed successively via a feed track in a feed direction. The apparatus also includes a rotor device with a rotating body that is rotatable about an axis of rotation on the stator device. The apparatus further includes a drive unit for the rotating body. The rotating body includes at least one receptacle for a container. The receptacle aligns with the transfer opening in a transfer position. The stator device includes a dispensing opening at a distance from the transfer opening. Each container can be fed to the dispensing opening by rotation of the rotating body. The stator device also includes a guide element for each container in the direction of the dispensing opening, and support elements for each container on opposite sides of the dispensing opening.

26 Claims, 9 Drawing Sheets

(51) Int. Cl.

| | |
|---|---|
| ***B65G 11/20*** | (2006.01) |
| ***B65G 47/04*** | (2006.01) |
| ***B65G 47/24*** | (2006.01) |

(56) References Cited

U.S. PATENT DOCUMENTS

| | | | | | |
|---|---|---|---|---|---|
| 4,130,194 | A | | 12/1978 | Schindel et al. | |
| 4,413,556 | A | * | 11/1983 | Ackley | B41F 17/36 101/40 |
| 4,818,381 | A | * | 4/1989 | Tanaka | B65G 47/256 198/359 |
| 5,067,632 | A | * | 11/1991 | Aubry | B23K 9/206 221/268 |
| 5,233,151 | A | * | 8/1993 | Aoyama | B23K 9/206 219/98 |
| 7,258,222 | B2 | * | 8/2007 | Marti Sala | B65G 47/1464 198/393 |
| 8,051,971 | B2 | * | 11/2011 | Marti Sala | B65G 47/1457 198/450 |
| 11,401,114 | B2 | * | 8/2022 | Prystupa | B07B 13/16 |

FOREIGN PATENT DOCUMENTS

| | | | | | |
|---|---|---|---|---|---|
| DE | 3709933 | A1 | | 10/1988 | |
| DE | 3922439 | C2 | | 1/1991 | |
| DE | 69200752 | T2 | | 4/1995 | |
| DE | 102022111875 | A1 | | 11/2023 | |
| JP | S56146636 | A | | 11/1981 | |
| JP | 2004203524 | A | | 7/2004 | |
| WO | WO-2022161522 | A2 | * | 8/2022 | G01F 11/24 |
| WO | WO-2024008475 | A1 | * | 1/2024 | B65B 65/003 |

* cited by examiner

CONVEYING APPARATUS FOR CONTAINERS, MORE PARTICULARLY PHARMACEUTICAL CONTAINERS

CROSS-REFERENCE TO RELATED APPLICATIONS

This application is a continuation patent application of international application number PCT/EP2023/069925, filed on Jul. 18, 2023, and claims priority to German application number 10 2022 118 095.6, filed on Jul. 19, 2022. The contents of international application number PCT/EP2023/069925 and German application number 10 2022 118 095.6 are incorporated herein by reference in their entireties and for all purposes.

FIELD

The present disclosure relates to a conveying apparatus for containers, in particular for pharmaceutical containers made of a plastic material, which may specifically be plastic bottles. However, the scope of the present disclosure is not limited to an application with pharmaceutical packaging means.

BACKGROUND

Machines for processing pharmaceutical containers often use so-called "conveying pots" which are conveying apparatuses for containers to be processed usually added via bags. On the outlet side of the conveying pot, the containers are usually fed via a feed track for the conveying apparatus of the type described above, in order to be further processed there. A conveying apparatus configured as a conveying pot is, for example, described in the non-prepublished patent application DE 10 2022 118 875.4 by the same applicant.

Containers in the form of vials typically have two different orientations at the outlet side of the conveying pot without any influence by the user, with the alignments of the vials being randomly distributed. For example, vials can be transported by the feed track with the neck leading or with the bottom leading. However, for further processing, it is desirable that the containers have a uniform orientation. For changing the orientation of the containers, it is known to use conveying apparatuses with, for example, disks, screws, hooks, pendulums, switches or drop shafts. The purpose of these devices is to bring a misaligned container into the correct orientation.

In particular, pharmaceutical containers can have a wide variety of variants. The containers may differ from one another, for example, in their geometry and/or material and, consequently, in the position of the center of gravity. Accordingly, it is desirable to be able to process containers of different designs via a conveying apparatus. It is also advantageous if processing is possible under various influencing factors with respect to temperature, humidity, possible electrostatic charging of the containers due to the material and surface condition of the containers.

An object underlying the present disclosure is to provide a conveying apparatus which makes improved processing of pharmaceutical containers possible.

SUMMARY

In an aspect of the present disclosure a conveying apparatus for containers made of a plastic material is provided. The containers may be pharmaceutical containers. The apparatus comprises:

- a stator device having a transfer opening for the containers, which can be fed successively via a feed track in a feed direction, for example in an unaligned manner,
- a rotor device, which comprises at least one rotating body, rotatable about an axis of rotation on the stator device, wherein the at least one rotating body comprises at least one receptacle for the container, which receptacle aligns with the transfer opening in a transfer position, and
- a drive unit for the rotating body.

The stator device comprises a dispensing opening at a distance from the transfer opening, to which dispensing opening the container can be fed by rotation of the at least one rotating body. The stator device further comprises a guide element for the container in the direction of the dispensing opening, and support elements for the container on opposite sides of the dispensing opening. The guide element may be a guide track that tapers in the direction of the dispensing opening.

BRIEF DESCRIPTION OF THE DRAWINGS

The foregoing summary and the following description may be better understood in conjunction with the drawing figures, of which.

DETAILED DESCRIPTION

Figure 1:
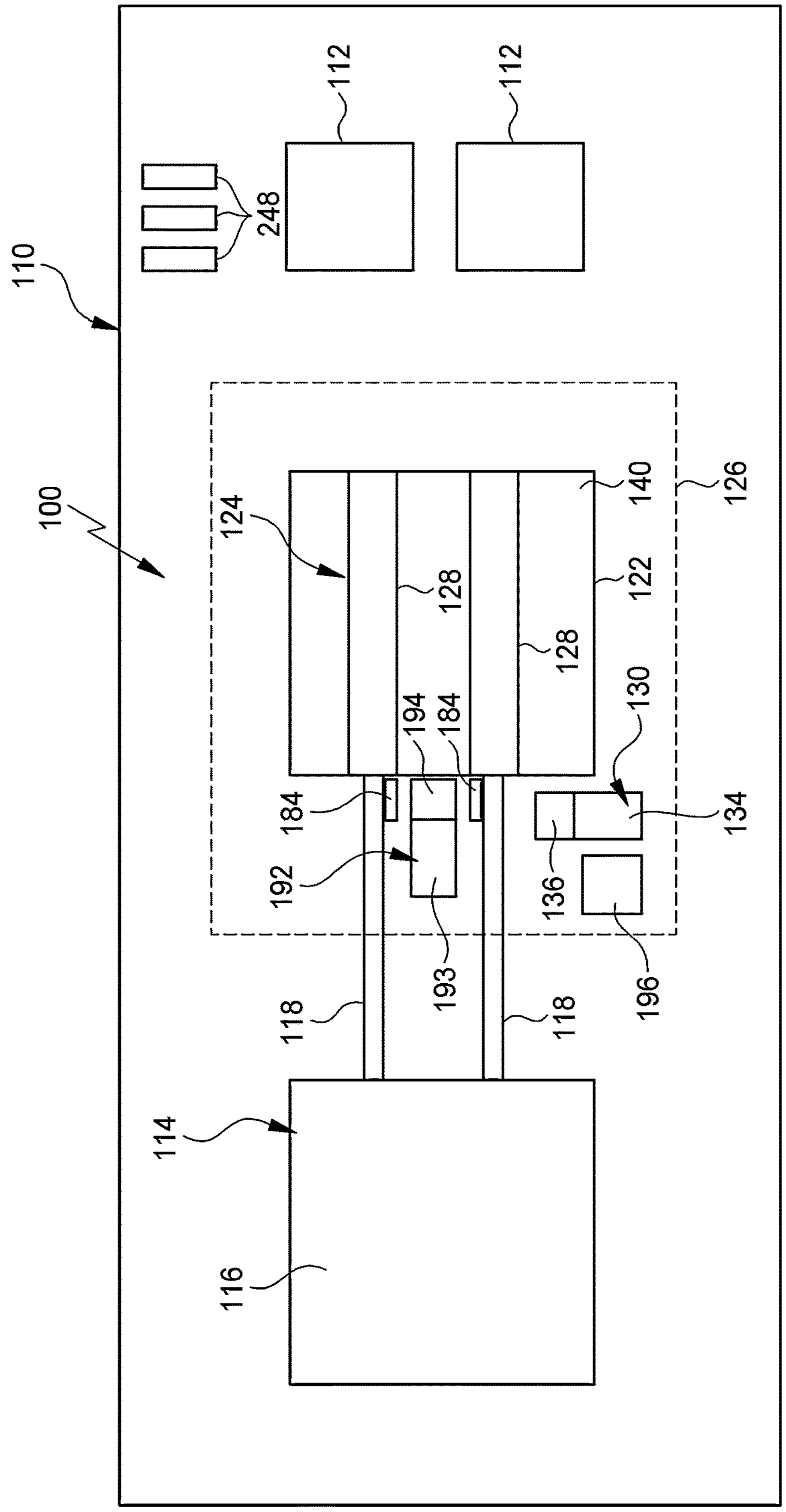
FIG. 1 shows a schematic representation of a machine for processing, in particular pharmaceutical containers, which machine comprises a conveying apparatus in accordance with the present disclosure in a preferred embodiment.

Although the present disclosure is illustrated and described herein with reference to specific embodiments, the present disclosure is not intended to be limited to the details shown. Rather, various modifications may be made in the details within the scope and range of equivalents and without departing from the present disclosure.

The present disclosure relates to a conveying apparatus for in particular pharmaceutical containers made of a plastic material, the apparatus comprising a stator device having a transfer opening for the containers, which can be fed successively via a feed track in a feed direction, for example in an unaligned manner, a rotor device, which comprises a rotating body, rotatable about an axis of rotation on the stator device, and a drive unit for the rotating body, wherein the at least one rotating body comprises at least one receptacle for the container, which receptacle aligns with the transfer opening in a transfer position. The stator device comprises a dispensing opening at a distance from the transfer opening, to which dispensing opening the container can be fed by rotation of the at least one rotating body. The stator device further comprises a guide element for the container in the direction of the dispensing opening, and support elements for the container on opposite sides of the dispensing opening. The guide element may be a guide track that tapers in the direction of the dispensing opening, In the conveying apparatus in accordance with the present disclosure, the containers to be processed, for example pharmaceutical vials made of a plastic material, are fed, preferably via a feed track, to the transfer opening on the stator device. For example, the vials may have a random alignment in two orientations. The feed track can, for example, be connected to an outlet of a conveying pot. Depending on their condition, the containers can, for example, be fed "by accumulation," wherein following containers push a preceding container in the feed track and/or into the transfer opening. The containers can be conveyed one after the other from the transfer opening to the dispensing opening via the at least one rotating body. If the at least one receptacle aligns with the transfer opening, the container can pass into the receptacle. Here, "align" can in the present case be understood in particular as a relative arrangement of the transfer opening and the receptacle such that the container can pass, transversely to its longitudinal direction, from the transfer opening into the receptacle, wherein the receptacle is, for example, arranged below the transfer opening. The guide element guides the container in the direction of the dispensing opening such that the container can assume a desired target position and orientation when the receptacle aligns with the dispensing opening. Here, "align" can be understood in particular as a relative arrangement of the receptacle and the dispensing opening such that the container can pass from the receptacle into the dispensing opening, wherein the receptacle is, for example, arranged above the dispensing opening. In particular in the case of vials, a neck portion may, for example, rest against one of the support elements at the dispensing opening, depending on the original orientation. A tilting moment can in particular act on the container so that, as a consequence, the container can be dispensed through the dispensing opening with the bottom first and thus in the correct target orientation via the dispensing opening.

In a preferred embodiment, the guide element can in particular be a guide track which tapers in the direction of the dispensing opening and thereby guides the container.

An axis of the at least one receptacle is preferably aligned in parallel with the axis of rotation of the at least one rotating body and/or in parallel with the alignment of the transfer opening which preferably aligns with the feed direction.

The dispensing opening preferably has a smaller opening cross-section than the transfer opening.

Transversely to the transfer direction into the at least one receptacle, the transfer opening has, for example, an elongated cross-section. Transversely to the transfer direction from the at least one receptacle into the dispensing opening, the dispensing opening has, for example, a rather rectangular cross-section.

The guide element may, for example, be or comprise a slot guide. For example, one edge of the guide track can form a curb for the container, against which slot the container rests and is guided in the direction of the dispensing opening.

The guide element, in particular the guide track, is preferably arranged along an inner circumferential surface of a receiving opening of the stator device which receives the at least one rotating body. For example, the container can rest against the stator device while the container is being positioned in the receptacle during the rotation of the rotating body.

The guide element can, for example, extend from the transfer opening.

Alternatively or additionally, the guide element can extend to the dispensing opening.

The guide element, in particular the guide track, advantageously has a continuous taper at least in portions. Abrupt tapers on the guide element, which could lead to possible jamming of the container, can be avoided in this way.

It can be provided that the guide element, in particular the guide track, has a taper only in portions over its extent.

The taper may, for example, be conical.

Preferably, the guide track tapers on two opposite sides along the axis of rotation, for example in a V-shape.

The support elements lie opposite one another, for example in parallel with the feed direction.

In particular, it may be provided that the orientation of the container is not changed during transport in the at least one receptacle from the transfer opening to the dispensing opening. For example, the container is aligned in the feed direction in the transfer opening and passes into the at least one receptacle in this orientation, wherein the container maintains this orientation up to the dispensing opening.

In an advantageous embodiment of the present disclosure, the guide track has, for example, a depression in which the container engages during the rotation of the at least one rotating body, wherein the support elements are formed by an edge of the dispensing opening raised relative to the depression. For example, a neck portion of a container may rest on the edge, whereby the container tilts into the dispensing opening or whereby the tilting movement is assisted.

The transfer opening is advantageously arranged above the dispensing opening in relation to a height direction. In particular, the transfer opening can be arranged directly above the dispensing opening in the direction of gravity.

An angular distance of the transfer opening and the dispensing opening to each other in relation to the axis of rotation can, for example, be 180°, in particular in the last-mentioned advantageous embodiment.

It is favorable if the container passes from the transfer opening into the at least one receptacle and/or from the at least one receptacle into the dispensing opening under the influence of gravity.

In an advantageous embodiment of the present disclosure, it is favorable if the at least one rotating body is a cylinder or comprises a cylinder, wherein a container arranged in the transfer opening rests against a lateral surface of the cylinder until the at least one receptacle aligns with the transfer opening. In this way, a structurally simple design of the conveying apparatus can be achieved. The lateral surface of the cylinder can retain the container in the transfer opening. Only when the receptacle aligns with the transfer opening does the container pass into the receptacle, preferably falling under the influence of gravity.

In the aforementioned embodiment, the rotating body can also be considered to be roller-shaped, at least in portions.

The cylinder, for example, is a right circular cylinder.

The conveying apparatus preferably comprises a drop shaft for the container adjoining the dispensing opening. The container can fall through the drop shaft under the influence of gravity and can therefore be fed in a structurally simple manner to further processing. The drop shaft is, for example, formed by a tube or a hollow profile.

The drop shaft can be at least partially formed by the stator device.

The at least one rotating body favorably comprises two or more receptacles, whereby an increased number of containers can be processed by means of the conveying apparatus.

The receptacles can advantageously have equal angular distances from one another in the circumferential direction of the axis of rotation.

As explained at the beginning, the possibility exists, for example, for the containers to be fed “by accumulation”, wherein a leading container can be pushed into the transfer opening by following containers.

It may prove favorable if the transfer opening is a through-opening of the stator device and if the conveying apparatus comprises a stop element coupled to the at least one rotating body, wherein a fed container can be moved in the transfer opening until contacting the stop element. By means of the dynamic pressure exerted on it, the container is, for example, pushed into the transfer opening until it contacts the stop element.

Preferably, the stop element retreats relative to the transfer opening under the rotation of the at least one rotating body. This allows the container to have sufficient play in the transfer opening so that it can, for example under the influence of gravity, pass into the receptacle that aligns with the transfer opening. A following container can be retained, for example, by means of a locking element as explained below.

Here, “retreating” can occur in particular as a result of the shape or contour of the stop element, which can be partially at a distance from the transfer opening during the rotation in order to make further movement of the container possible.

Alternatively, “retreating” can, for example, be carried out by an active movement of the stop element away from the transfer opening by means of a drive element.

In a different embodiment of the present disclosure, it can be provided that, when the stop element retreats, the container, pushed by a following container, can be moved further in the feed direction into the transfer opening until it passes into the receptacle aligned with the transfer opening. Following containers can move the leading container further in the feed direction until the at least one receptacle aligns with the transfer opening and can receive the container.

The stop element can, for example, be connected to the at least one rotating body or formed thereby.

For example, the stop element is a disk element which projects radially beyond the at least one rotating body in relation to the axis of rotation and covers the transfer opening. For example, if the rotating body is arranged in the aforementioned receiving opening, the disk element can be arranged outside the receiving opening and project radially beyond the rotating body. The disk element is, for example, secured on an end face of the rotating body.

The stop element can, for example, have a height profile which has a rising flank and a falling flank toward the stator device. The at least one receptacle preferably aligns with the transfer opening when the height profile at a transition region from the falling flank to the rising flank or at the falling flank is arranged at the transfer opening. When the height profile is moved past the transfer opening by rotation of the rotating body, the stop element can, as explained above, retreat as a result of the rotation and thereby provide play for the container within the transfer opening so that the container can, for example, fall into the receptacle when it aligns with the transfer opening.

In contrast, at the rising flank, at a transition region between the rising flank and the falling flank, and at the falling flank near the last-mentioned transition region, the distance of the height profile from the transfer opening is smaller so that the container can initially strike and be blocked against further movement into the transfer opening.

The height profile is, for example, arranged or formed radially on an outer edge of the aforementioned disk element.

The conveying apparatus can preferably comprise a locking element, by means of which a following container can be fixed in a fixing position in the transfer opening or on the feed side of the transfer opening when the container passes into the at least one receptacle, and which releases the following containers for further movement into the transfer opening in a release position, wherein the locking element can be transferred by means of a drive unit from the fixing position to the release position and/or vice versa. For example, in the case of containers fed by accumulation, a following container can be fixed by means of the locking element in order to retain it when the leading container passes into the receptacle aligned with the transfer opening. When released via the locking element, the following container can pass further into the transfer opening and be subsequently processed. For example, as explained above, the leading container can be provided with play via the retreating stop element.

The conveying apparatus can, for example, comprise a control device, via which the drive unit for the at least one rotating body and the drive unit for the locking element are synchronized. In this way, it can be ensured that the working cycles of at least one rotating body and of the locking element are coordinated with one another such that the containers can be processed reliably.

For example, it is provided that it can be determined by means of a, for example optical, sensor device that the container contacts the stop element. If this is the case, the drive unit can be activated in order to transfer the locking element to the fixing position and to fix the following container. The first-mentioned container can be provided with play for transfer into the receptacle.

If the locking element assumes the fixing position, the receptacle in a preferred embodiment is not yet aligned with the transfer opening, but for example only after rotation of the rotating body about the axis of rotation for a specified or specifiable angle of rotation.

For example, a pneumatic drive unit can be used for the locking element and actuates a coupling element (for example, a plunger or lever) that is coupled to the locking element in order to move said locking element from the fixing position to the release position and/or vice versa.

In a preferred embodiment of the present disclosure, the locking element can, for example, be a clamping element, by means of which the following container can be clamped to an edge of the transfer opening.

The drive unit for the at least one rotating body can, for example, be or comprise an electric drive unit. For example, a stepper motor or servomotor is used, the driving force of which can be transmitted directly or indirectly, for example via a gearing mechanism, to the at least one rotating body.

As mentioned, the conveying apparatus in accordance with the present disclosure comprises at least one rotating body, it being possible for a plurality of rotating bodies to be provided.

In a preferred embodiment, the conveying apparatus comprises two or more rotating bodies, transfer openings, dispensing openings and guide elements (preferably optionally disk elements and/or locking elements), wherein each rotating body is assigned a transfer opening, a dispensing opening and a guide element. This allows an increased number of containers to be processed by means of the conveying apparatus. For example, the containers can be fed via parallel feed tracks and processed side by side, one above the other, or one below the other. Preferably, the rotating bodies can have the same working cycle and/or be operated synchronously.

It has proven to be advantageous if the rotating bodies can be driven jointly by means of one drive unit. This eliminates the need for separate drive units. For example, a drive unit can drive a gearing mechanism that is operatively connected to two or more rotating bodies.

The conveying apparatus can comprise a stator device from which the transfer openings, dispensing openings and guide elements are formed and which is used together with the two or more rotating bodies. This eliminates the need for separate stator devices, for example.

It is advantageous if the conveying apparatus comprises a plurality of format sets which differ from one another with regard to their container-specific properties, wherein a respective format set comprises at least one of the set of stator device, rotating body, stop element or locking element. The format sets provide a structurally simple option for adapting the conveying apparatus to different containers to be processed. For example, a relatively simple conversion of the conveying apparatus can be carried out by using different format parts for the stator device, the rotating body and the stop element. As a result, the conveying apparatus has high versatility.

For a preferably structurally simple design, it can be favorable if the stator device comprises two stator parts directly or indirectly connected to one another and in particular detachably connected to one another in a position of use and together form the transfer opening, a receiving opening for the at least one rotating body, and the dispensing opening.

The stator parts can, for example, be at least partially plate-shaped and, in the position of use, preferably lie flat against one another via respective contact surfaces. For example, a normal of the contact surfaces is aligned along the feed direction.

It can be favorable if the conveying apparatus comprises a holding device and at least one holding part connected to or formed thereby, wherein the at least one holding part is connected to a first stator part that is positioned at a distance from the holding device, and a second stator part is arranged between the holding device and the first stator part and comprises at least one through-opening through which the at least one holding part extends. This, for example, offers the possibility of fixing the second stator part via the first stator part to at least one holding part and thereby to the holding device.

The holding device can, for example, be connected to a substructure or frame for the conveying apparatus.

The first stator part can be secured, preferably detachably, on at least one holding part. Favorably, corresponding magnetic elements are provided on the first stator part and on the at least one holding part in order, from the perspective of cleaning, to enable pharmaceutically clean and user-friendly handling of the conveying apparatus.

The second stator part is preferably free of a connection to the holding device and is fixed thereto via the first stator part.

At least one holding part can extend through the at least one through-opening in the second stator part, for example with play, and thereby enable a movement of the second stator part relative to the first stator part and/or the holding device in the position of use of the stator parts relative to one another. This can enable, at least in part, a kind of floating mounting for the second stator part. In practice, it has been shown that this promotes operation of the conveying apparatus without jamming. If, for example, the stator parts together form the transfer opening, the dispensing opening and/or the receiving opening for the rotating body, the second stator part can be moved slightly within the existing play in the event of existing or impending jamming, and jamming can be avoided or eliminated.

Two or more holding parts may be provided.

In the preferred implementation of the present disclosure, the holding part can, for example, be pin-shaped and can extend through the through-opening. On the end face, at least one magnetic element can be provided for interaction with a corresponding magnetic element of the first stator part.

The first stator part and the second stator part can, for example, engage with one another, wherein a projection on the first stator part engages in a receptacle of the second stator part, or vice versa. The engagement may have some play. In a corresponding manner, the holding part can extend through the through-opening with play. The holding part can be in one part or several parts.

It is favorable if the stator device and/or the at least one rotating body can be sterilized non-destructibly and/or washed non-destructibly by means of a cleaning liquid, in particular water. As a result, the conveying apparatus has advantageous cleaning characteristics.

With reference to the drawings, an advantageous embodiment of the conveying apparatus in accordance with the present disclosure, denoted as a whole by reference numeral 100, is discussed below. In the present case, the conveying apparatus 100 is used to convey containers 102. In the present exemplary embodiment, the containers 102 are pharmaceutical containers 102, in particular vials 104 which are manufactured, for example, from a plastic material. The vials 104 have a body portion 106 and a neck portion 108.

FIG. 1 shows the conveying apparatus 100 as part of a machine 110 for processing the containers, wherein the machine 110 comprises at least one processing station 112.

In the processing direction, the conveying apparatus 110 is arranged downstream of another conveying apparatus 114 which comprises a so-called conveying pot 116.

On the outlet side, the conveying pot is adjoined by at least one feed track 118. Containers 102 are usually introduced into the conveying pot 116 via bags and transferred from there to the feed track 118. The containers 102 can have two opposite orientations. On the one hand as shown in the drawing, a bottom 120 of the container 102 can be leading. On the other hand, the neck portion 108 of the container 102 can be arranged in a leading manner, which in the present case is shown schematically only in FIG. 11.

As explained in detail below, the conveying apparatus 100 comprises a stator device 122, a rotor device 124 and a holding device 126. The holding device 126 serves, for example, to secure the conveying apparatus 100 on a substructure or frame of the machine 110 and, in particular, to hold the stator device 122 and the rotor device 124.

The rotor device 124 comprises at least one rotating body 128, a drive unit 130 for the rotating body 128 and a stop element 132.

In the present case, the conveying apparatus 100 is advantageously configured with two positions. In this case, the possibility exists to simultaneously process containers 102 which are fed from the conveying pot 116 via two feed tracks 118.

For processing, the conveying apparatus 100 therefore comprises more than one rotating body 128, in particular two rotating bodies 128 for two-position operation.

However, the functioning of the rotating bodies 128 and of the corresponding components of the stator device 122 does not differ from one another so that only the functioning of one rotating body 128 together with the stator device 122 is discussed below. The explanations in this respect apply correspondingly to the other rotating body 128.

The stator device 122 here is designed such that it receives both rotating bodies 128, and separate stator devices 122 do not have to be provided.

In the conveying apparatus 100, it is advantageous that the drive unit 130 is assigned to both rotating bodies 128. Separate drive units 130 for the rotating bodies 128 can thus be avoided.

The drive unit 130 is, for example, electric and comprises a servomotor or stepper motor 134. The motor 134 can be operatively connected to the particular rotating body 128 via a gearing mechanism 136 shown schematically in FIG. 1 in order to drive the particular rotating body 128 to rotate about an axis of rotation 138.

For example, a belt drive 136 is used for this, which can be held directly or indirectly on the holding device 126. Drive elements, which are operatively connected to the rotating bodies 128, can be driven jointly via a belt to drive the rotating bodies 128. It is conceivable that the rotating bodies 128 rotate in the same direction or in opposite directions. Instead of the belt drive 126, a different type of gearing mechanism can also be used.

For example, the drive motor is arranged in a substructure of the machine 110. The gearing mechanism 136 can, for example, be positioned below the feed tracks 118.

Figure 2:
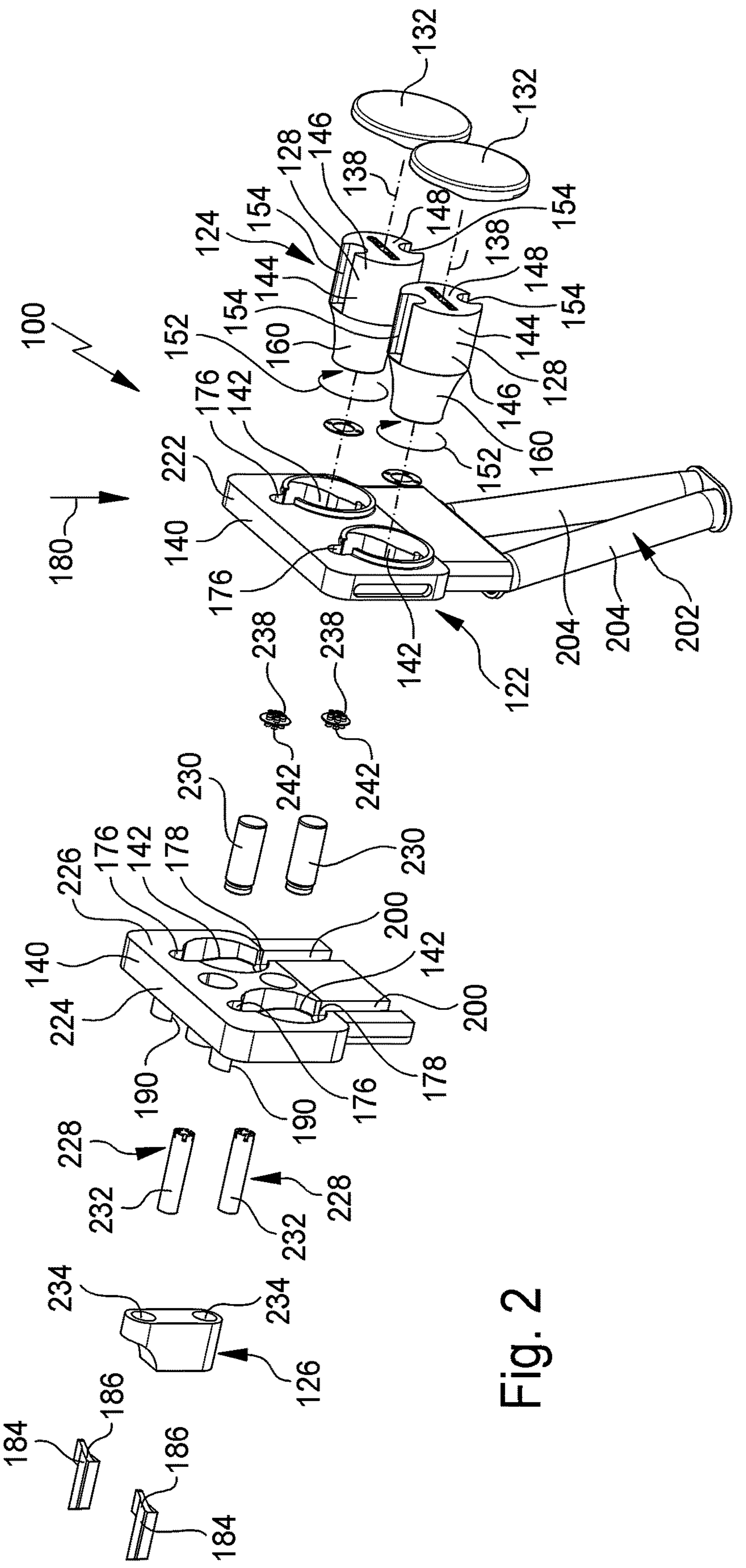
FIG. 2 shows a partial representation of the conveying apparatus of FIG. 1 in a perspective exploded view.
Figure 3:
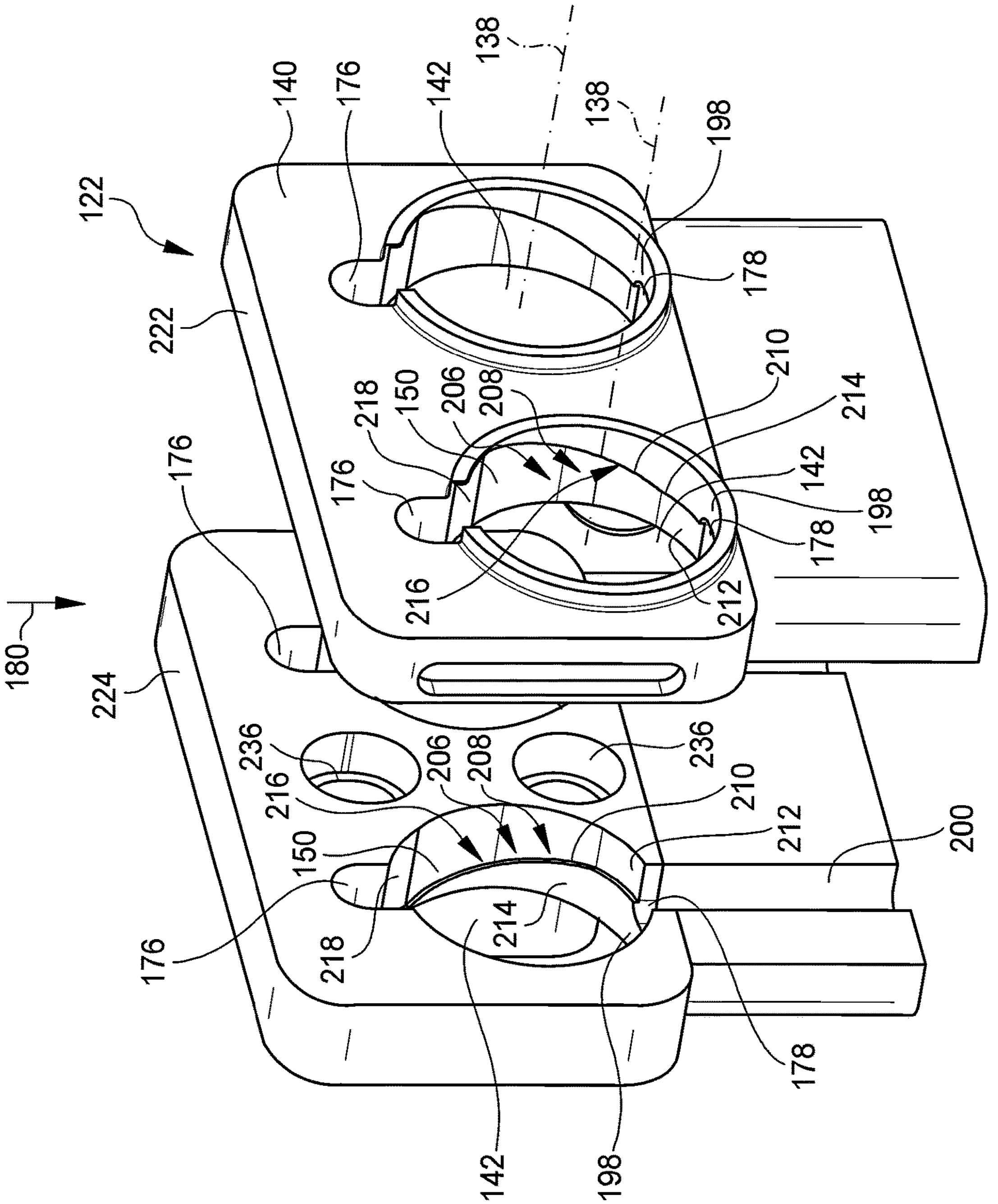
FIG. 3 shows an enlarged view of two stator parts of the conveying apparatus in a perspective exploded view.
Figure 4:
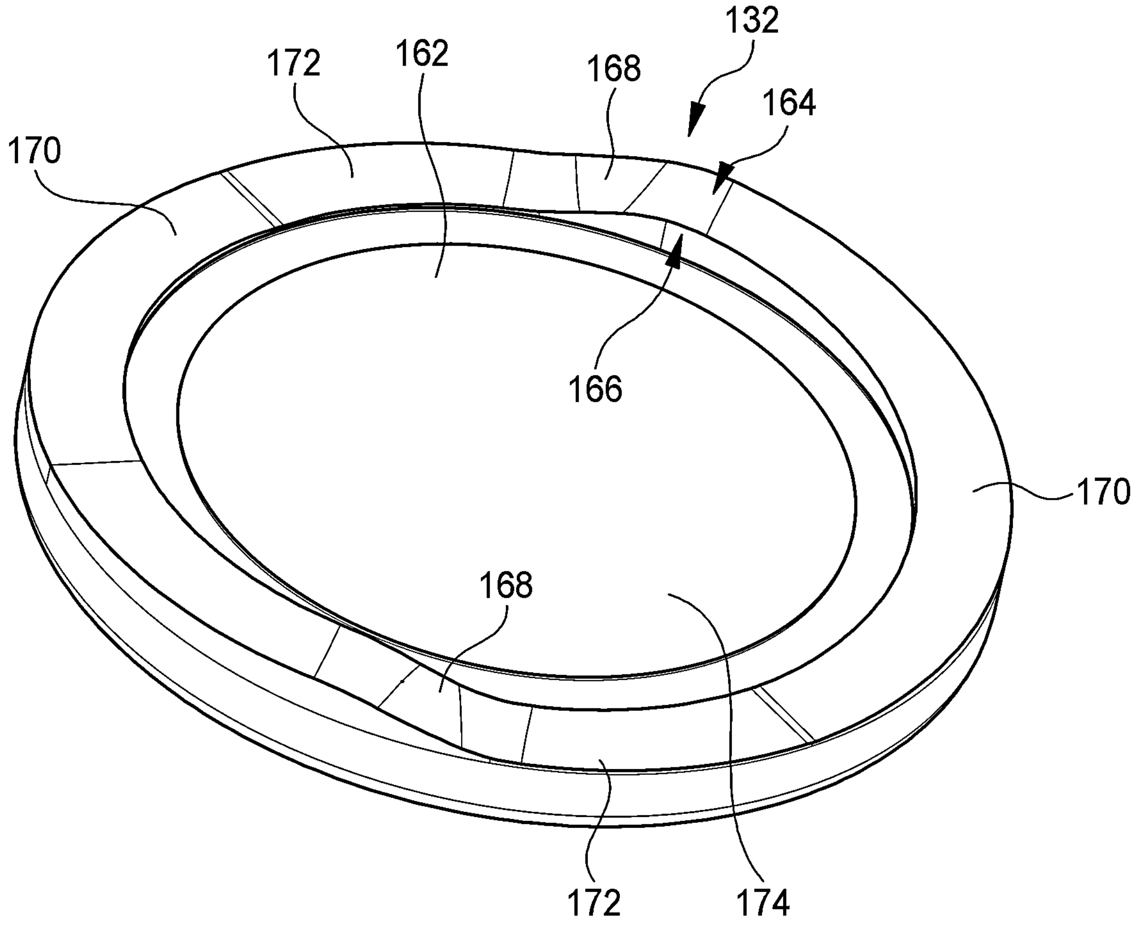
FIG. 4 shows a perspective representation of a disk-shaped stop element of the conveying apparatus.

As can be seen in particular in FIGS. 2 and 3, the stator device 122 forms an enclosure 140 for the rotating body/bodies 128. It forms a receiving opening 142, the axis of which aligns with the axis of rotation 138. The rotating body 128 is inserted into the receiving opening 142. Here, the rotating body 128 projects beyond the stator device 122 on the rear side facing the gearing mechanism 136. In the opposite direction, the rotating body 128 also projects forward beyond the stator device 122.

At least within the portion arranged in the receiving opening 142, the rotating body 128 is preferably configured as a cylinder 144 whose axis aligns with the axis of rotation 138. The cylinder 144 comprises a lateral surface 146 on the outer circumference and an end face 148 at the front.

Here, the rotating body 128 is dimensioned such that the cylinder 144 is received in a positive-locking manner in the receiving opening 142 but is rotatable about the axis of rotation 138 under the action of the drive unit 130. In this case, the cylinder 144 moves along an inner circumferential surface 150. An arrow 152 indicates the direction of rotation of the rotating body 128. It can be provided that the direction of rotation 152 runs in the opposite direction or is also reversible.

The rotating body 128 has at least one receptacle 154 on the cylinder 144 for a container 102. Here, two receptacles 154 are provided which are diametrically opposite one another with respect to the axis of rotation 138.

The receptacles 154 are formed as groove-shaped recesses 156 open at the front in the direction of the end face 148. An axis 158 of the receptacle 154 is aligned in parallel with the axis of rotation 138. The receptacle 154 is also open on the rear side of the cylinder 144 facing away from the end face 148.

In the direction of the gearing mechanism 136, the cylinder 144 is adjoined by a fastening portion 160 which is coupled to the gearing mechanism 136.

The rotor device 124 furthermore comprises the stop element 132 assigned to a particular rotating body 128. Here, the stop element 132 is a disk element 162, which is secured, preferably detachably, on the end face 148.

In the radial direction in relation to the axis of rotation 138, the disk element 162 projects beyond the cylinder 144. Facing the stator device 122, the disk element 162 has a stop portion 164 radially on the outer side.

As can be seen in particular in FIGS. 4 and 6 to 9, 11 and 12, the stop portion 164 is not flat. Instead, the stop portion 164 has a height profile 166 changing in the axial direction. Due to the height profile 166, the stop portion 164 can retreat relative to the transfer opening 176 when the rotating body 128 rotates.

In the present example, the height profile 166 comprises at least one rising flank 168 and at least one falling flank 170 in the direction of rotation 152. Here, in accordance with the number of receptacles 154, there are two rising flanks 168 and two falling flanks 170, opposite one another in each case.

While the flank 168 rises relatively steeply here, the flank 170 in contrast falls relatively flatly.

Between the flanks 168 and 170 is a transition region 172 of the stop portion 164. At the transition region 172, the disk element 162, for example, aligns with a central portion 174 of the disk element 162 facing the end face 148.

For example, the disk element 162 is arranged on the rotating body 128 such that the receptacle 154 is adjacent in the axial direction to the transition region 172 or the flank 170, in particular near the transition region 172.

The disk element 162 is connected to the rotating body 128 in a rotationally fixed manner. When the rotating body 128 rotates, the stop portion 164 retreats relative to the stator device 122 at the falling flank 170 and at the transition region 172. During further rotation, the stop portion 164 advances through the rising flank 168 in the direction of the stator device 122. It is understood that retreating and advancing results from the height profile 166, whereas the stop element 132 itself maintains its distance relative to the stator device 122.

The stator device 122 comprises a transfer opening 176 assigned to a particular rotating body and furthermore a particular dispensing opening 178. The transfer opening 176 and the dispensing opening 178 are diametrically opposite one another with respect to the axis of rotation 138. Here, the transfer opening 176 is arranged in a height direction above the dispensing opening 178, in particular directly above it in the direction of gravity 180.

Position and orientation details here refer to the intended use of the conveying apparatus 100.

Figure 6:
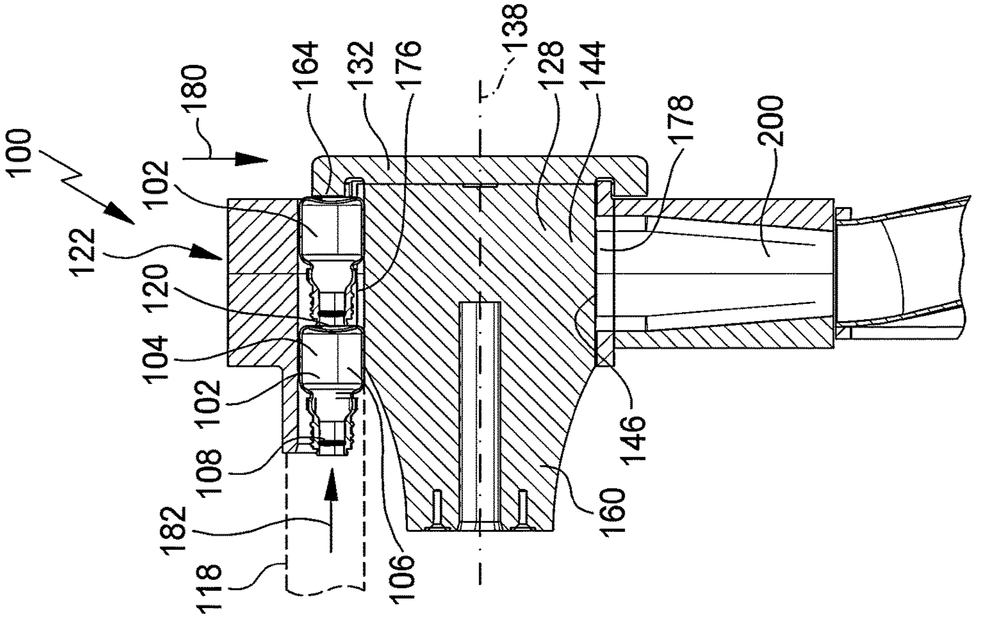
FIG. 6 shows a sectional view along line 6-6 in FIG. 5.
Figure 5:
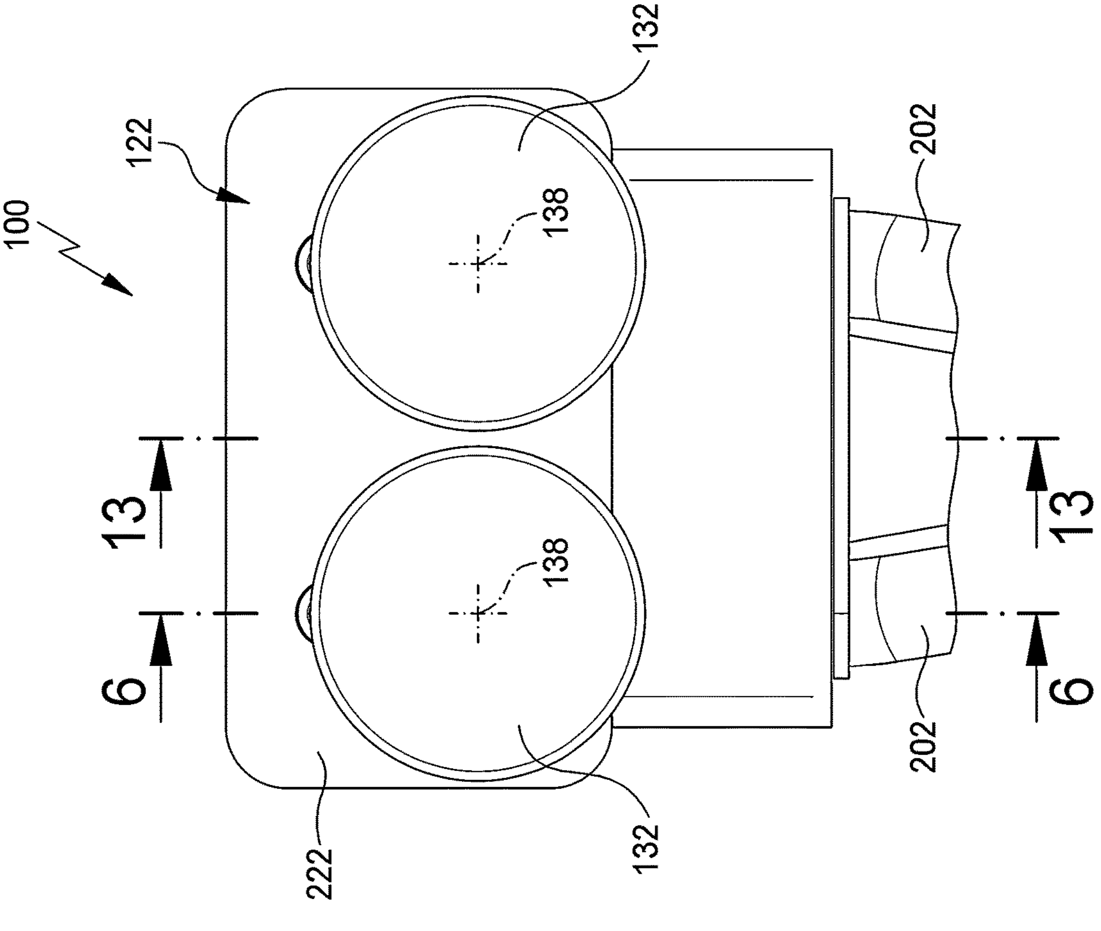
FIG. 5 shows a front view of the conveying apparatus at a first point in time while processing the containers.

The transfer opening 178 extends as a through-opening through the stator device 122 and, in particular, is open at the front facing the stop portion 164. The feed track 118 is arranged on the opposite side at the rear. The containers 102 can be fed via the feed track 118 in a feed direction 182 parallel to the axis of rotation 138 (FIG. 6).

An axis of the transfer opening 176 is aligned in parallel with the axis of the receptacle 154 and with the axis of rotation 138.

In intended use, it can, in particular, be favorable if the containers 102 are fed "by accumulation," wherein a leading container 102 is pushed by following containers 102. Accordingly, there is dynamic pressure in the chain of successive containers 102.

In the present case, the transfer opening 176 is favorably dimensioned such that there is room for a first container 102 in the transfer opening 176 and also for a second container 102, up to a portion with the largest diameter (FIG. 6), in order to be able to be fixed with a locking element 184.

At the transfer opening 176, the conveying apparatus 100 comprises the locking element 184. The locking element 184 here is a clamping element 186 which can be brought into contact with the container 102 in order to fix it to an edge of the transfer opening 176 in a clamping manner. For this purpose, a cutout 190 is arranged in the side of the stator device 122, in which cutout the locking element 184 engages (FIG. 2, wherein the locking element 184 is arranged at a distance from the stator device 122 in the exploded view).

The locking element 184 is assigned to a drive unit 192 which is shown schematically in FIG. 1. In the present case, the drive unit 192 comprises a pneumatic drive 193 which acts on a coupling element 194. The coupling element 194 is, for example, a movable plunger or lever on which the locking element 184 is secured.

By means of the drive unit 192, the locking element 184 can be transferred to a release position. In the release position, the container 102 is released and can be pushed further into the transfer opening 176 when said transfer opening lying in front of it is free. From the release position, the locking element 184 can be transferred to a fixing position in which the container 102 is fixed in a clamping manner.

Favorably, the drive units 130 for the rotating body 128 and 192 for the locking element 184 are synchronized with one another. For this purpose, the conveying apparatus 100 may comprise a control device 196.

It can be provided that the two locking elements 184 can be actuated by means of a common drive unit 192 or that separate drive units 192 are provided.

The dispensing opening 178 is arranged on the underside of the stator device 122. A cross-section of the dispensing opening 178 transverse to the transfer direction to the receptacle 154 is smaller than that of the transfer opening 176. If the transfer opening 176 is elongated, the dispensing opening 178 has an approximately rectangular cross-section.

Figure 11:
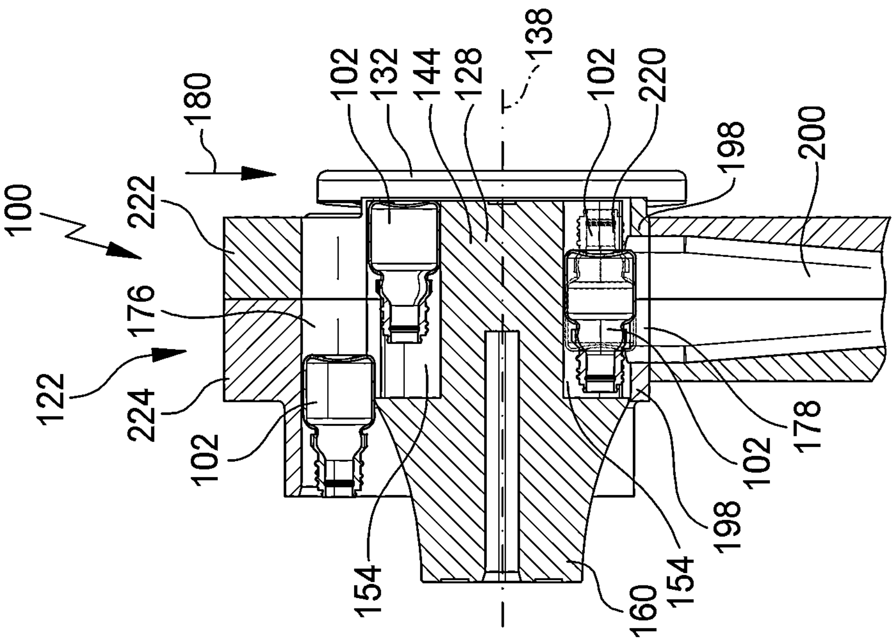
FIG. 11 shows a sectional view along line 11-11 in FIG. 10, showing the stop element.

Two support elements 198 are opposite one another with respect to the dispensing opening 178, here in parallel with the feed direction 182 and thus along the axis 158 of the receptacle 154 (see, for example, FIGS. 3 and 11).

At the bottom, the dispensing opening 178 is adjoined by a drop shaft 200 which is initially formed in the stator device 122 itself. The underside of the stator device 122 is adjoined by a support element 202, here in the form of a tube 204, which continues the drop shaft 200. The containers 102 can pass through the dispensing opening 178 into the drop shaft 200 and are fed via said drop shaft to further processing.

Figure 8:
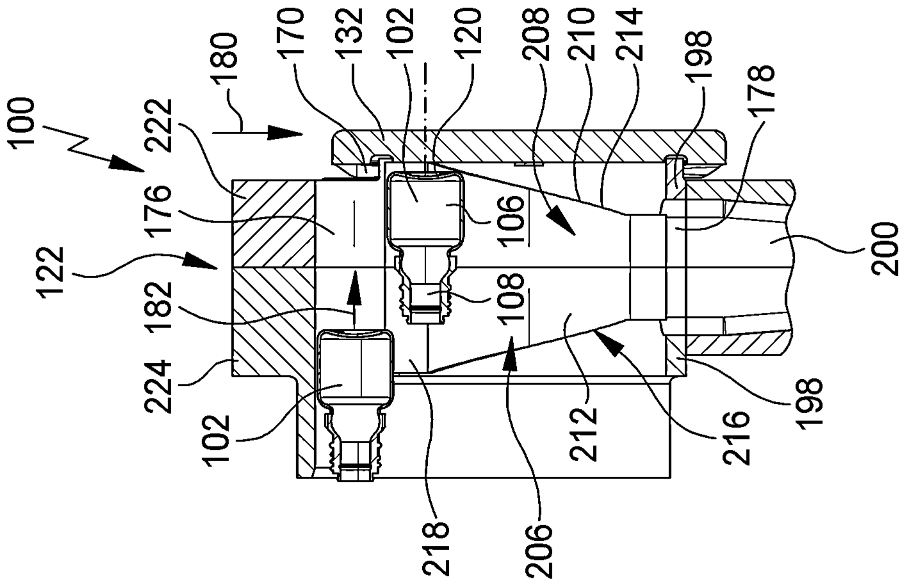
FIG. 8 shows a representation corresponding to FIG. 7 with a rotating body of the conveying apparatus omitted.
Figure 9:
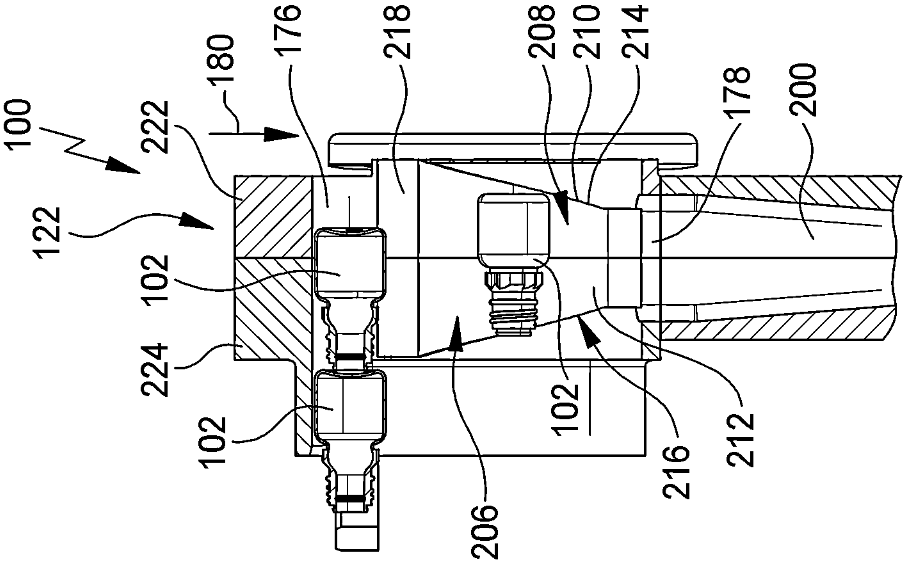
FIG. 9 shows a representation at a later point in time while processing the containers, again with the rotating body omitted.

As can be seen in particular in FIGS. 3, 8 and 9, the stator device 122 has a guide element 206 for the transported containers 102. The guide element 206 here is configured as a guide track 208 which is arranged along the inner circumferential surface 150 of the receiving opening 142.

The guide track 208 forms a slot 210 and has a depression 212 with a respective edge 214. The edges 214 are opposite one another and limit the depression 212 in the axial direction.

In the region of the depression 212, the radius of the receiving opening 142 is larger than at the edge 214.

The guide track 208 comprises a taper 216 in the direction of the dispensing opening 178. The edge 214 protruding relative to the depression 212 forms the support element 198 in the region of the dispensing opening 178 in each case.

The guide track 208 extends substantially over the entire length from the transfer opening 176 to the dispensing opening 178, in the present example with the exception of a portion 218, adjacent to the transfer opening 176, on the inner circumferential surface 150.

The portion 218 has approximately the extent of the receptacle 154 in the radial direction. For example, the radius of the receiving opening 142 may be larger at the portion 218 than at the depression 212 in order to facilitate the transfer of the container 102 into the receptacle 154 through play.

The taper 216 is, in particular, continuous after the portion 218 up to the dispensing opening 178.

The taper 216 in the direction of the transfer opening 176 can be configured differently and makes the guidance of the container 102 possible. In the present example, the taper 216 occurs along the axis of rotation 138 on both sides, substantially in a V-shape.

Alternatively, it may be provided that only a one-sided taper 216 is provided along the axis of rotation 138, which taper is arranged at the front (facing the stop element 132) or at the rear (facing away from the stop element 132).

The functioning of the conveying apparatus 100 is explained below.

The containers 102 fed by accumulation pass from the conveying pot 116 via the feed track to the transfer opening 176. A leading container 102 (on the right in FIG. 6) can thus pass to the stop portion 164 by being pushed by the following containers 102. In this case, the stop portion 164 covers the transfer opening 176. For example, the container 102 strikes at a transition region between the rising flank 168 and the falling flank 170 or at the falling flank 170, for example near the last-mentioned transition region.

The rotational position of the rotating body 128 is set such that the lateral surface 146 supports the container 102 from below until said container can subsequently pass into the receptacle 154.

As a result of the rotation of the rotating body 128, the stop portion 164 retreats with respect to the transfer opening 176, as explained above, so that the container 102 can be provided with play. In this case, the height profile 166 at the transition region 172 or, near the transition region 172, at the falling flank 170 is arranged at the transfer opening 176. When the receptacle 154 aligns with the transfer opening 176, the container 102 can fall into the receptacle 154 under the influence of gravity and due to the existing play within the transfer opening 176 (FIGS. 7 and 8).

The locking element 184 was preferably previously transferred to the fixing position in order to fix the following container 102 in a clamping manner when the first container 102 strikes the stop portion 164. As a result, the second container 102 no longer acts on the first container 102, and said first container can be provided with play by the rotation of the stop element 132.

Figure 7:
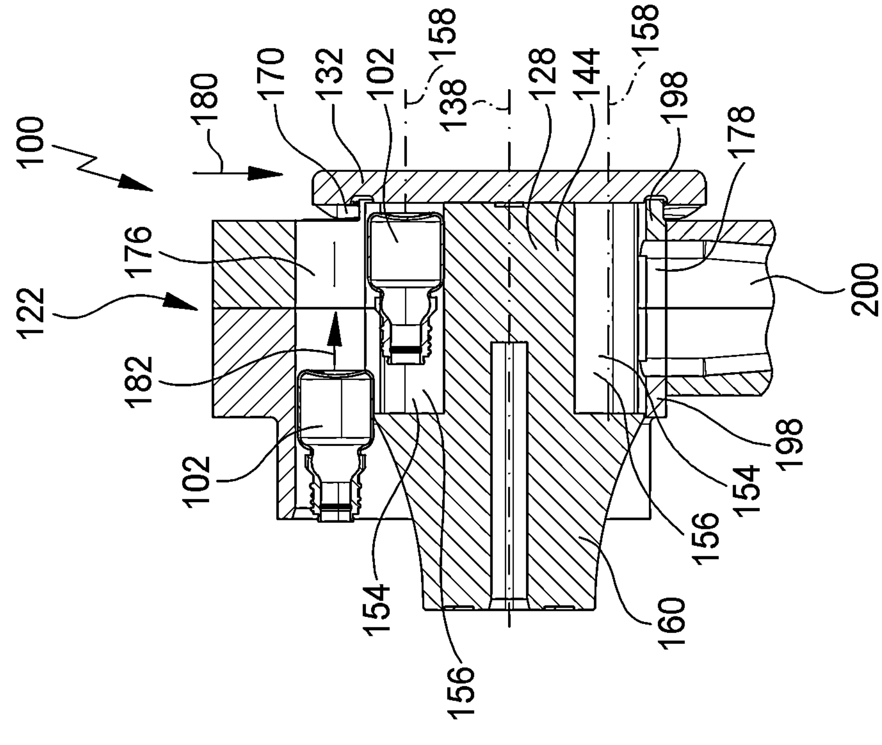
FIG. 7 shows a representation corresponding to FIG. 6 at a later point in time while processing the containers.

FIGS. 7 and 8 show the same point in time, with the rotating body 128 omitted, so that the view of the guide track 208 with the taper 216 is free due to the course of the edges 214.

By subsequent rotation of the rotating body 128, the container 102 is moved in the receptacle 154 along the inner circumferential surface 150. In the process, the container 102 engages in the depression 212 of the guide track 208 and comes into contact with the edge 214.

Via the guide track 208, the container 102 is centered and guided in the direction of the dispensing opening 178. This is shown by way of example in FIG. 9, wherein the container 102 contacts the edge 214 with the bottom 120 and is thereby axially displaced while it is guided in the receptacle 154.

FIG. 9 shows a point in time at which the receptacle 154 is rotated by substantially 90° with respect to the transfer opening 176.

At this point in time, another container 102 has already been fed via the feed track 118. The second container 102 has meanwhile been released via the locking element 184 and can be pushed into the transfer opening 176 under the dynamic pressure of the following containers 102.

Figure 10:
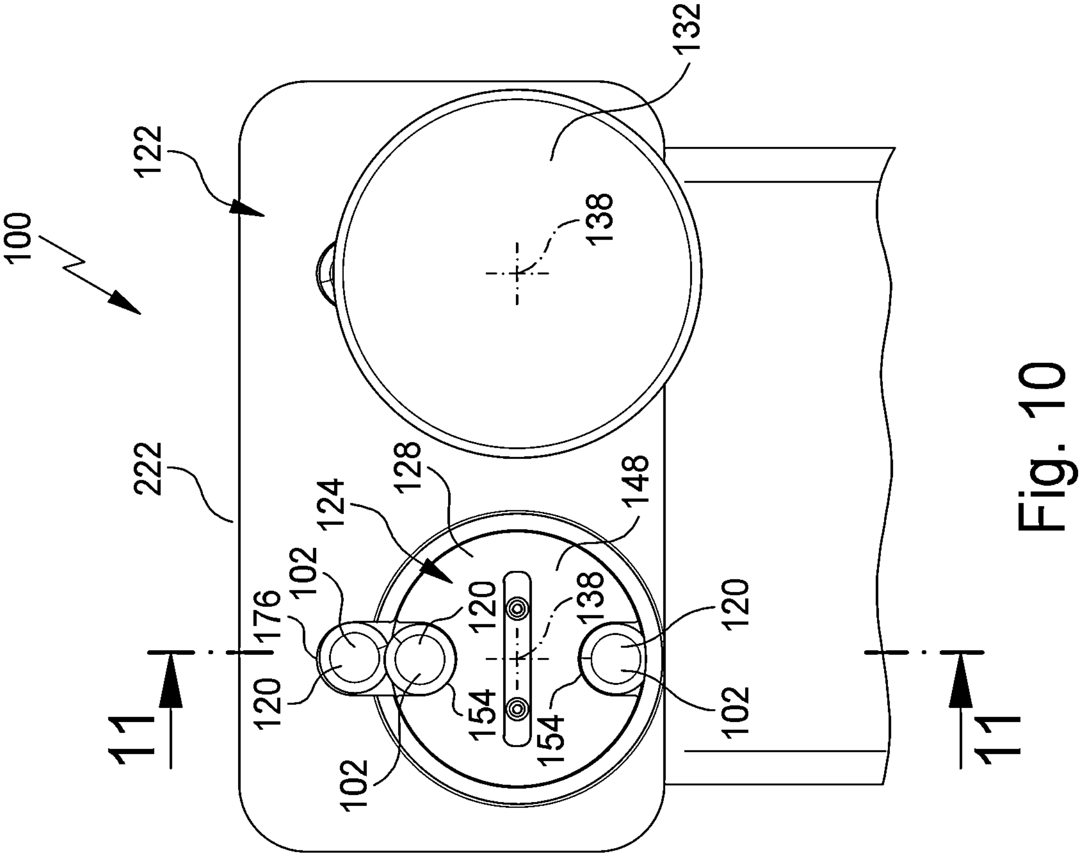
FIG. 10 shows a front view of the conveying apparatus at a later point in time while processing the containers, with a disk-shaped stop element omitted.
Figure 12:
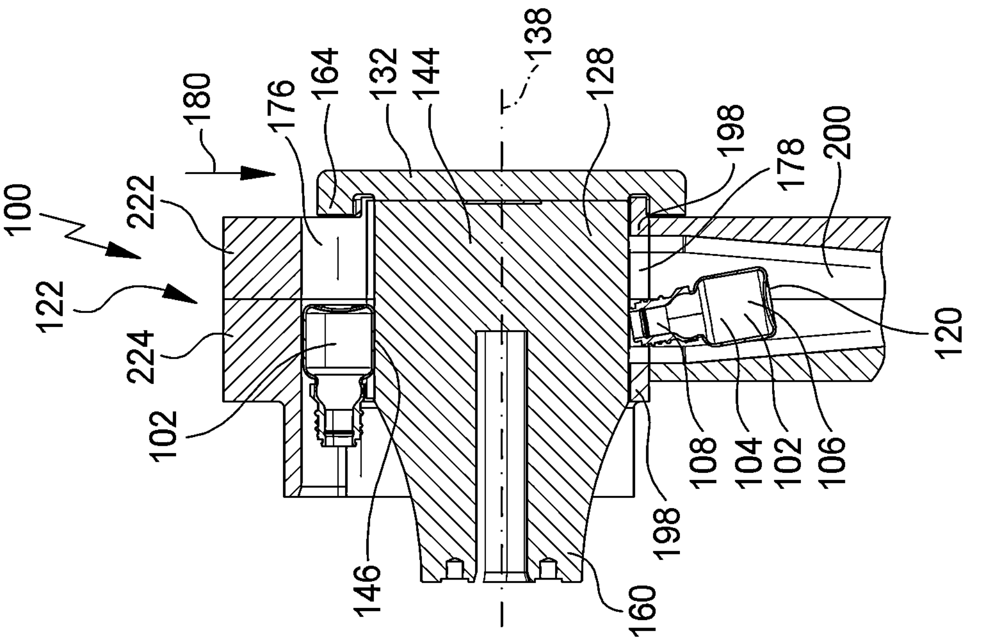
FIG. 12 shows a representation corresponding to FIG. 11 at a later point in time while processing the containers.

With further rotation of the rotating body 128, the container 102 is guided further in the direction of the dispensing opening 178. At the point in time shown in FIGS. 10 and 11, the rotating body 128 has completed a 180° rotation since receiving the first container 102. The first container 102 passes to the dispensing opening 178. The neck portion 108 can contact one of the support elements 198. As a result, a tilting moment acts on the container 102, which can tilt downward with the body portion 106. The tilted container 102 falls with the body portion 106 leading under the influence of gravity into the drop shaft 200 (FIG. 12).

FIG. 11 also shows how the second container 102 has passed from the transfer opening 176 into the receptacle 154 under the influence of gravity in a manner corresponding to FIG. 7. Previously, the third container 102 was fixed in a clamping manner to the edge of the transfer opening 176 by means of the locking element 184.

In deviation from the representation in accordance with FIGS. 7 and 8, the second container 102 is axially displaced in the receptacle 154 in comparison to the first container 102 in FIGS. 7 and 8. Here, this is due to the fact that the particular container 102 is arranged with play in the transfer opening 176 so that, depending on the load, a different axial position can result during the fall into the receptacle 154.

It has proven to be advantageous that the guide track 208 can be used to center the containers 102 relative to the dispensing opening 178. This centering is independent of which orientation of the containers 102 assume. The case in which the container 102 is transported with the bottom 120 leading and the neck portion 108 contacts the support element 198 on the side facing away from the stop element 132 (FIG. 11, on the left) has been considered so far.

Even given a different orientation of the container 102, the neck portion 108 can contact a support element 198, which in this case is the support element 198 facing the stop element 132 (FIG. 11, on the right, with a thinner contour 220 of the container 102).

Thus, regardless of the orientation of the containers 102, it is possible via the conveying apparatus 100 to decouple them in the correct target position via the drop shaft 200, namely in an upright orientation.

In particular, the design of the stator device 122 is discussed below.

Figure 13:
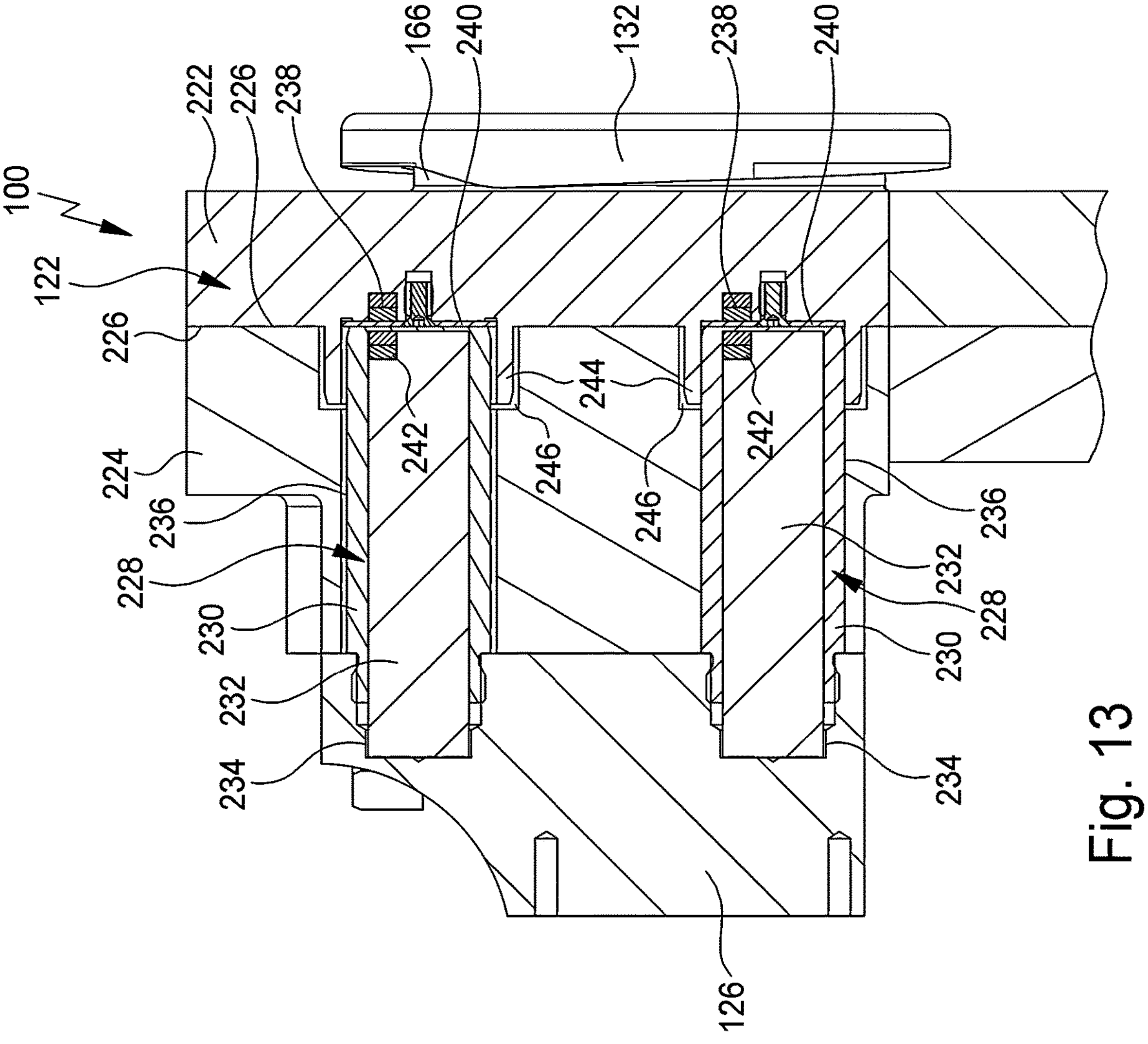
FIG. 13 shows a sectional view along line 13-13 in FIG. 5.

As can be seen in particular in FIGS. 2, 3 and 13, the stator device 122 comprises a first stator part 222 and a second stator part 224. The stator parts 222, 224 are each substantially plate-shaped and can rest flat against one another via mutually facing contact surfaces 226 in order to form the enclosure 140.

Half of the receiving opening 142 and the openings 176, 178 are in each case formed by the stator parts 222, 224. The same applies to the drop shafts 200 (FIGS. 2 and 3).

In the present case, the stator part 222 is held on the holding device 126. As can be seen, for example with reference to FIGS. 2 and 13, the conveying apparatus 100 here comprises two holding parts 228 connected to the holding device 126.

In the present example, the particular holding part 228 is in two parts and comprises a sleeve element 230 and a pin element 232. The sleeve element 230 is fixed to the edge of a receptacle 234 of the holding device 126 and surrounds the pin element 232 engaging in the receptacle 234.

The two-part design of the holding part 228 makes it possible to design only the sleeve element 230 pharmaceutically compatible, whereas the pin element 232 does not need to be such because it is completely surrounded and sealed off by the sleeve element 230.

In an alternative embodiment, the holding part 228 can be in one piece.

The elements 230, 232 extend through a through-opening 236 in the second stator part 224 and project in the direction of the first stator part 222.

The first stator part 222 comprises a plurality of magnetic elements 238 which are arranged in their assigned receptacles on the side facing the stator part 224. A cover element 240, for example in the form of a disk, covers the magnetic elements 238. The cover element is connected to the stator part 222, for example by screwing.

Figure 14:
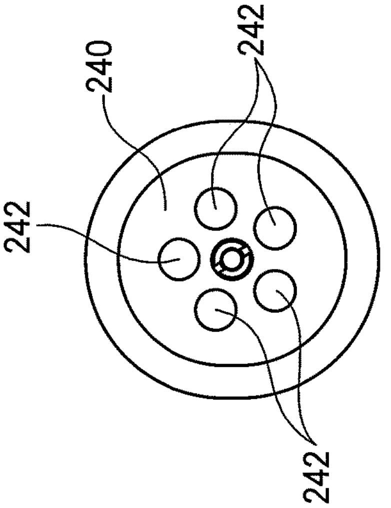
FIG. 14 shows an enlarged view of magnetic elements of the conveying apparatus.

On the end face, the pin element 232 comprises corresponding magnetic elements 242 which can interact with the magnetic elements 238. FIG. 14 shows the magnetic elements 242 in a front view of the pin element 232, which are preferably encapsulated therein, in particular cast or covered by a cover element. Here, a plurality of magnetic elements 242 arranged over the end face of the pin element 232 is provided.

The use of magnetic elements 238, 242 enables pharmaceutically compatible implementation of the conveying apparatus 100 with good cleaning properties. Instead of the magnetic connection of the stator parts 222, 224 to one another, a different type of connection can be provided, directly or via the holding part 228.

Furthermore, a projection 244, annular in the present case, is arranged on the stator part 222 and engages in a corresponding recess 246 in the stator part 224. The projection 244 surrounds the sleeve element 230.

The end face of the pin element 232 aligns with the contact surface 226 of the stator part 224. In the position of use, the stator part 222 is detachably connected to the pin element 232 and rests aligned via the contact surfaces 226 against the stator part 224, which in turn is held via the sleeve element 230 and the pin element 232. An axial displacement is prevented by the stator part 222.

In the present case, two elements 230, 232, two through-openings 236 and two projections 244 with two recesses 246 and corresponding magnetic elements 238, 242 are provided (FIG. 13). In an arrangement of these components, the holding part 228 is arranged with play within the through-opening 236, here the upper one. This allows a movement of the stator part 224 relative to the stator part 222 via the play even in the position of use. This proves to be advantageous in order to avoid jamming of containers 102.

In the event of jamming, the stator part 222 can be detached by overcoming the magnetic force. This also offers the advantage that, due to the particular distribution of the openings 142, 176, and 178 into both stator parts 22, 224, the openings, as well as the jammed containers 102 located therein, can be accessed in an easy to handle manner.

The conveying apparatus 100 comprises a plurality of format sets 248 (FIG. 1). A particular format set comprises a stator device 122, a rotating body 128, a stop element 132 and/or a locking element 184. The format parts of a format set are container-specific and can be exchanged for the format parts of another format set 248. This allows the conveying apparatus 100 to be used with containers 102 of different designs in a simple and user-friendly manner.

LIST OF REFERENCE NUMERALS

100 Conveying apparatus
102 Container
104 Vial
106 Body portion
108 Neck portion
110 Machine
112 Processing station
114 Conveying apparatus
116 Conveying pot
118 Feed track
120 Bottom
122 Stator device
124 Rotor device
126 Holding device
128 Rotating body
130 Drive unit
132 Stop element
134 Motor
136 Gearing mechanism
138 Axis of rotation
140 Enclosure
142 Receiving opening
144 Cylinder
146 Lateral surface
148 End face
150 Inner circumferential surface
152 Direction of rotation
154 Receptacle
156 Recess
158 Axis
160 Fastening portion
162 Disk element
164 Stop portion
166 Height profile
168 Rising flank
170 Falling flank
172 Transition region
174 Central portion
176 Transfer opening
178 Dispensing opening
180 Gravity
182 Feed direction
184 Locking element
186 Clamping element
190 Cutout
192 Drive unit
193 Drive
194 Coupling element
196 Control device
198 Support element
200 Drop shaft
202 Supporting element
204 Tube
206 Guide element
208 Guide track
210 Slot
212 Depression
214 Edge
216 Taper
218 Portion
220 Contour
222, 224 Stator part
226 Contact surface
228 Holding part
230 Sleeve element
232 Pin element
234 Receptacle
236 Through-opening
238 Magnetic element
240 Cover element
242 Magnetic element
244 Projection
246 Recess
248 Format set

The invention claimed is:

1. A conveying apparatus for pharmaceutical containers made of a plastic material, the conveying apparatus comprising:
- a stator device having at least one transfer opening for the pharmaceutical containers, which are fed successively via a feed track in a feed direction;
- a rotor device, which comprises at least one rotating body rotatable about an axis of rotation on the stator device; and
- a first drive unit for the at least one rotating body,
- the at least one rotating body comprising at least one receptacle for receiving each of the pharmaceutical containers, the at least one receptacle aligning with the at least one transfer opening in a transfer position,
- the stator device comprising at least one dispensing opening at a distance from the at least one transfer opening, each of the pharmaceutical containers being feedable to the at least one dispensing opening by rotation of the at least one rotating body,
- the stator device also comprising at least one guide element for the pharmaceutical containers in a direction of the at least one dispensing opening, and
- the stator device further comprising support elements for the pharmaceutical containers on opposite sides of the at least one dispensing opening.

2. The conveying apparatus according to claim 1, wherein the at least one guide element is a guide track that tapers in the direction of the at least one dispensing opening.

3. The conveying apparatus according to claim 2, wherein the guide track has at least partially a continuous taper.

4. The conveying apparatus according to claim 2, wherein the guide track has a depression in which each pharmaceutical container engages during rotation of the at least one rotating body, and wherein the support elements are formed by an edge of the at least one dispensing opening, the edge being raised relative to the depression.

5. The conveying apparatus according to claim 1, wherein an axis of the at least one receptacle is aligned in parallel with the axis of rotation of the at least one rotating body and/or in parallel with an alignment of the at least one transfer opening.

6. The conveying apparatus according to claim 1, wherein the at least one guide element is arranged along an inner circumferential surface of a receiving opening of the stator device receiving the at least one rotating body.

7. The conveying apparatus according to claim 1, wherein the at least one guide element extends from the at least one transfer opening and/or wherein the at least one guide element extends to the at least one dispensing opening.

8. The conveying apparatus according to claim 1, wherein the at least one receptacle is configured to maintain an orientation of each pharmaceutical container so that the orientation is unchanged during transport in the at least one receptacle from the at least one transfer opening to the at least one dispensing opening.

9. The conveying apparatus according to claim 1, wherein the at least one transfer opening is arranged above the at least one dispensing opening in a height direction.

10. The conveying apparatus according to claim 1, wherein the at least one rotating body is or comprises a cylinder, wherein each pharmaceutical container arranged in the at least one transfer opening rests against a lateral surface of the cylinder until the at least one receptacle aligns with the at least one transfer opening.

11. The conveying apparatus according to claim 1, further comprising a drop shaft for each pharmaceutical container, the drop shaft adjoining the at least one dispensing opening and formed by a tube or a hollow profile.

12. The conveying apparatus according to claim 1, wherein the at least one receptacle comprises two or more receptacles.

13. The conveying apparatus according to claim 12, wherein the two or more receptacles have equal angular distances from one another in a circumferential direction of the axis of rotation.

14. The conveying apparatus according to claim 1, wherein the at least one transfer opening is a through-opening of the stator device and wherein the conveying apparatus comprises a stop element coupled to the at least one rotating body, wherein each pharmaceutical container is movable in the at least one transfer opening until contacting with the stop element.

15. The conveying apparatus according to claim 14, wherein the stop element retreats relative to the at least one transfer opening under rotation of the at least one rotating body.

16. The conveying apparatus according to claim 14, wherein at least one of the following applies:

- the stop element is connected to or formed by the at least one rotating body, wherein the stop element is a disk element that projects radially beyond the at least one rotating body and covers the at least one transfer opening;
- the stop element has a height profile that has a rising flank and a falling flank toward the stator device, wherein the at least one receptacle aligns with the at least one transfer opening when the height profile at a transition region from the falling flank to the rising flank or at the falling flank is arranged at the at least one transfer opening.

17. The conveying apparatus according to claim 1, wherein the conveying apparatus is operable to convey a preceding container of the pharmaceutical containers and a following container of the pharmaceutical containers, the conveying apparatus comprising a locking element via which the following container is fixable in a fixing position in the at least one transfer opening or on a feed side of the at least one transfer opening, and which releases the following container for further movement into the at least one transfer opening in a release position, wherein the locking element is transferable by a second drive unit from the fixing position to the release position and/or vice versa.

18. The conveying apparatus according to claim 17, wherein the conveying apparatus comprises a control device via which the first drive unit for the at least one rotating body and the second drive unit for the locking element are synchronized.

19. The conveying apparatus according to claim 17, wherein the locking element is a clamping element via which the following container is clampable to an edge of the at least one transfer opening.

20. The conveying apparatus according to claim 1, wherein the at least one rotating body comprises a plurality of rotating bodies, the at least one transfer opening comprises a plurality of transfer openings, the at least one dispensing opening comprises a plurality of dispensing openings, and the at least one guide element comprises a plurality of guide elements, wherein each rotating body is assigned to one of the transfer openings, one of the dispensing openings and one of the guide elements.

21. The conveying apparatus according to claim 1, further comprising a plurality of format sets which differ from one another with regard to container-specific properties, wherein each format set comprises at least one of the set of stator device and rotating body.

22. The conveying apparatus according to claim 1, wherein the stator device comprises a first stator part and a second stator part that are directly or indirectly connected to one another in a position of use and together form the at least one transfer opening, a receiving opening for the at least one rotating body, and the at least one dispensing opening.

23. The conveying apparatus according to claim 22, wherein the first stator part and the second stator part are at least partially plate-shaped and, in the position of use, rest against one another, via respective contact surfaces.

24. The conveying apparatus according to claim 22, further comprising a holding device and at least one holding part connected to or formed by the holding device, wherein the at least one holding part is connected to the first stator part, the first stator part being positioned at a distance from the holding device and the second stator part being arranged between the holding device and the first stator part, the second stator part comprising at least one through-opening through which the at least one holding part extends.

25. The conveying apparatus according to claim 24, wherein the first stator part is detachably securable on the at least one holding part by corresponding magnetic elements, and/or wherein the second stator part is free of a connection to the holding device.

26. The conveying apparatus according to claim 24, wherein the at least one holding part extends through the at least one through-opening with play and enables the second stator part to move relative to the first stator part and/or the holding device in the position of use of the first stator part and the second stator part relative to one another.

* * * * *